(12) United States Patent
Lima

(10) Patent No.: US 11,127,274 B1
(45) Date of Patent: Sep. 21, 2021

(54) CHILD TRACKING ASSEMBLY

(71) Applicant: Tyler Lima, Mission Viejo, CA (US)

(72) Inventor: Tyler Lima, Mission Viejo, CA (US)

( * ) Notice: Subject to any disclaimer, the term of this patent is extended or adjusted under 35 U.S.C. 154(b) by 0 days.

(21) Appl. No.: 17/009,481

(22) Filed: Sep. 1, 2020

(51) Int. Cl.
*G08B 21/02* (2006.01)
*H04W 4/029* (2018.01)
*G01K 3/00* (2006.01)
*G01S 19/17* (2010.01)
*G01P 13/00* (2006.01)
*G01K 13/20* (2021.01)

(52) U.S. Cl.
CPC .......... *G08B 21/0211* (2013.01); *G01K 3/005* (2013.01); *G01K 13/20* (2021.01); *G01P 13/00* (2013.01); *G01S 19/17* (2013.01); *G08B 21/023* (2013.01); *G08B 21/0269* (2013.01); *G08B 21/0288* (2013.01); *H04W 4/029* (2018.02)

(58) Field of Classification Search
CPC .................................................. G08B 21/0211
See application file for complete search history.

(56) References Cited

U.S. PATENT DOCUMENTS

| 6,301,494 | B1 * | 10/2001 | Schafer | A61B 5/0002 |
| | | | | 600/390 |
| 9,928,714 | B1 | 3/2018 | Lovell | |
| 10,121,347 | B1 | 11/2018 | Jones | |
| 10,136,248 | B2 * | 11/2018 | Kwon | H04W 4/80 |
| D838,194 | S | 1/2019 | Mays | |
| 10,249,166 | B1 | 4/2019 | Carter | |
| 10,290,378 | B1 | 5/2019 | Bujko | |
| 10,397,751 | B2 | 8/2019 | Shapiro | |
| 2010/0117822 | A1 | 5/2010 | Hyatt | |
| 2016/0057268 | A1 * | 2/2016 | Jiang | H04B 1/385 |
| | | | | 455/556.1 |
| 2018/0227754 | A1 | 8/2018 | Paez Velazquez | |
| 2020/0222032 | A1 * | 7/2020 | Stein | A61B 5/02405 |

FOREIGN PATENT DOCUMENTS

WO   WO2019166286   9/2019

* cited by examiner

*Primary Examiner* — Travis R Hunnings

(57) ABSTRACT

A child tracking assembly includes a bracelet that is wearable around a wrist of a child. A shaking senor is included and the shaking sensor is turned on when the shaking sensor senses movement exceeding a pre-determined threshold of intensity. A global positioning system (gps) transceiver is included for establishing the physical location of the child when the child is wearing the bracelet. An alert transceiver is included and the alert transceiver is in communication with a personal electronic device carried by a caregiver. The alert transceiver broadcasts the physical location of the child to the personal electronic device. Additionally, the alert transceiver broadcasts an alert signal to the personal electronic device when the shaking sensor is turned on.

4 Claims, 4 Drawing Sheets

CHILD TRACKING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tracking devices and more particularly pertains to a new tracking device for tracking the location of a child and determining if the child is being shaken.

(2) Description of Related Art Including Information Disclosed Under 37 CFR 1.97 and 1.98

The prior art relates to tracking devices including a variety of tracking devices that include a bracelet and a gps transceiver integrated therein for tracking the location of a child wearing the bracelet. Additionally, the gps transceiver is frequently in communication with a personal electronic device. The prior art discloses a tracking bracelet that includes a plurality of biometric sensors for sensing biological functions of a person wearing the bracelet. The prior art discloses a tracking device that is integrated into a watch band for tracking a person wearing the watch. The prior art discloses an identification bracelet that broadcasts identification information of user for accessing electronically secured areas.

BRIEF SUMMARY OF THE INVENTION

An embodiment of the disclosure meets the needs presented above by generally comprising a bracelet that is wearable around a wrist of a child. A shaking senor is included and the shaking sensor is turned on when the shaking sensor senses movement exceeding a pre-determined threshold of intensity. A global positioning system (gps) transceiver is included for establishing the physical location of the child when the child is wearing the bracelet. An alert transceiver is included and the alert transceiver is in communication with a personal electronic device carried by a caregiver. The alert transceiver broadcasts the physical location of the child to the personal electronic device. Additionally, the alert transceiver broadcasts an alert signal to the personal electronic device when the shaking sensor is turned on.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
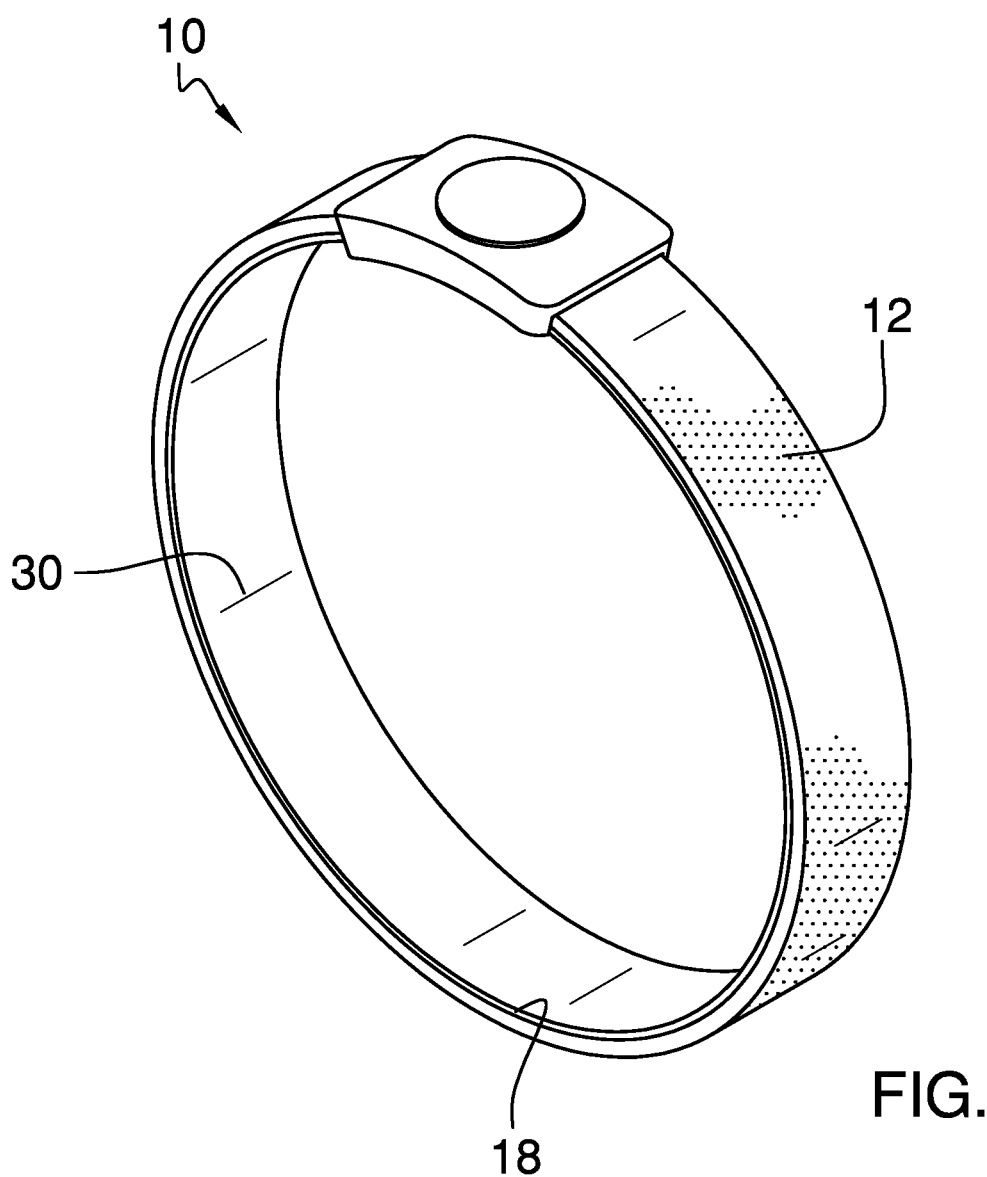
FIG. 1 is a perspective view of a child tracking assembly according to an embodiment of the disclosure.

With reference now to the drawings, and in particular to FIGS. 1 through 6 thereof, a new tracking device embodying the principles and concepts of an embodiment of the disclosure and generally designated by the reference numeral 10 will be described.

As best illustrated in FIGS. 1 through 6, the child tracking assembly 10 generally comprises a bracelet 12 that is wearable around a wrist 14 of a child 16. The bracelet 12 has an inwardly facing surface 18 and the bracelet 12 is comprised of a fluid permeable material. In this way the bracelet 12 can pass air therethrough thereby facilitating the child's skin that is beneath the bracelet 12 to breathe. The bracelet 12 may have a diameter that is sufficiently small to fit snugly around the wrist of a child between the ages of approximately two years old and approximately five years old.

A control circuit 20 is integrated into the bracelet 12. The control circuit 20 receives a shake input and a temperature input. A shaking sensor 22 is integrated into the bracelet 12 and the shaking sensor 22 is turned on when the shaking sensor 22 senses movement exceeding a pre-determined threshold of intensity. In this way the shaking sensor 22 can sense when the child 16 is being shaken by an assailant. Additionally, the shaking sensor 22 can determine if the child 16 has experienced a violent fall. The shaking sensor 22 is electrically coupled to the control circuit 20 and the control circuit 20 receives the shake input when the shaking sensor 22 is turned on. The shaking sensor 22 may comprise a digital accelerometer or other similar type of sensor.

A global positioning system (gps) transceiver 24 is provided and the gps transceiver 24 is integrated into the bracelet 12. The gps transceiver 24 is in communication with a gps 25 for establishing the physical location of the child 16 when the child 16 is wearing the bracelet 12. Moreover, the gps transceiver 24 is electrically coupled to the control circuit 20. The gps transceiver 24 may comprise a radio frequency transceiver or the like.

An alert transceiver 26 is provided and the alert transceiver 26 is integrated into the bracelet 12. The alert transceiver 26 is in communication with a personal electronic device 28 that is carried by a caregiver. The alert transceiver 26 broadcasts the physical location of the child 16 to the personal electronic device 28 to facilitate the caregiver to track the child 16. The alert transceiver 26 broadcasts an alert signal to the personal electronic device 28 when the shaking sensor 22 is turned on. In this way the alert transceiver 26 can alert the caregiver that the child 16 is in danger of being injured or abducted by an assailant. The alert transceiver 26 is electrically coupled to the control circuit 20 and the alert transceiver 26 broadcasts the alert signal when the control circuit 20 receives the shake input. The alert transceiver 26 may comprise a radio frequency transceiver or the like and alert transceiver 26 may employ Bluetooth communication protocols. The personal electronic device 28 may be a smart phone or other similar device with wireless communication capabilities.

A temperature sensor 30 is provided and the temperature sensor 30 is coupled to the bracelet 12. Additionally, the temperature sensor 30 is in thermal communication with the child 16 when the child 16 wears the bracelet 12 and the temperature sensor 30 is electrically coupled to the control circuit 20. The control circuit 20 receives the temperature input when the temperature sensor 30 senses a temperature that is either greater than or less than a pre-determined threshold temperature. Moreover, the alert transceiver 26 broadcasts a temperature alert signal to the personal electronic device 28 when the control circuit 20 receives the temperature input. In this way the temperature sensor 30 can alert the caregiver that the bracelet 12 has been removed from the child 16 or that the child 16 is experiencing a fever.

The temperature sensor 30 is positioned on the inwardly facing surface 18 of the bracelet 12 thereby facilitating the temperature sensor 30 to contact the user's skin when the bracelet 12 is worn. The temperature sensor 30 may be an electronic temperature sensor 30 of any conventional design. A power supply 32 is provided and the power supply 32 is integrated into the bracelet 12. The power supply 32 is electrically coupled to the control circuit 20 and the power supply 32 comprises at least one battery.

Figure 2:
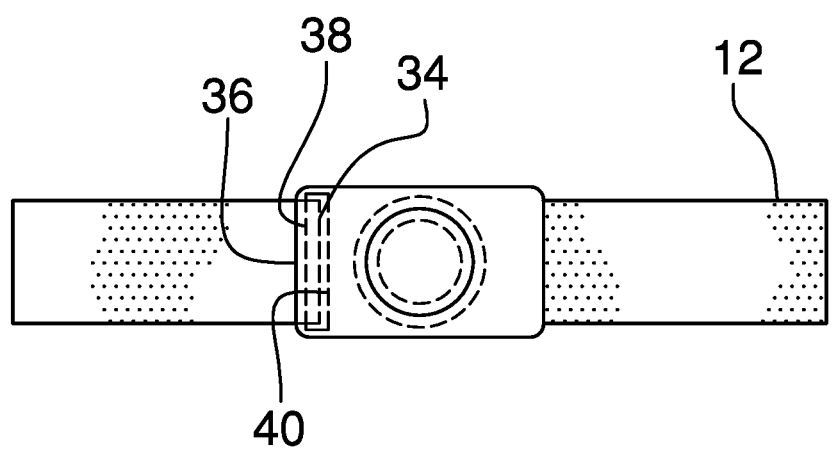
FIG. 2 is a top phantom view of an embodiment of the disclosure.
Figure 3:
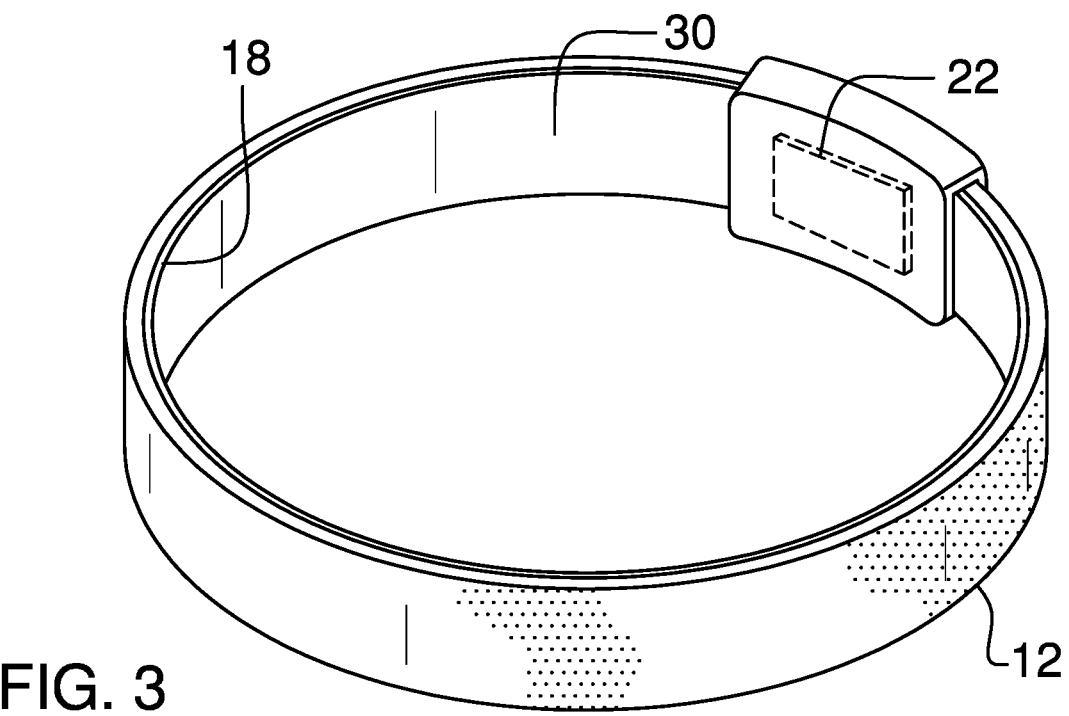
FIG. 3 is a bottom perspective view of an embodiment of the disclosure.
Figure 4:
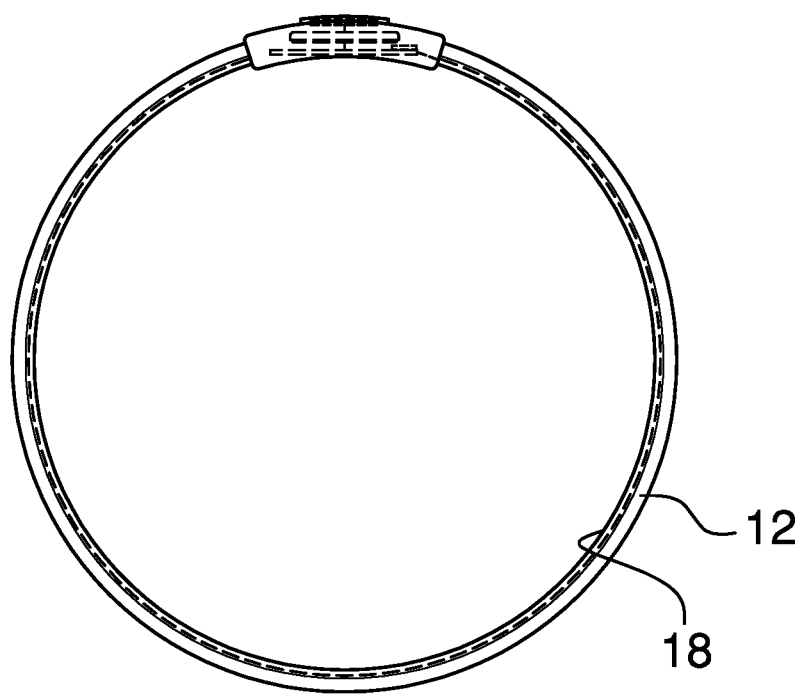
FIG. 4 is a front phantom view of an embodiment of the disclosure.
Figure 5:
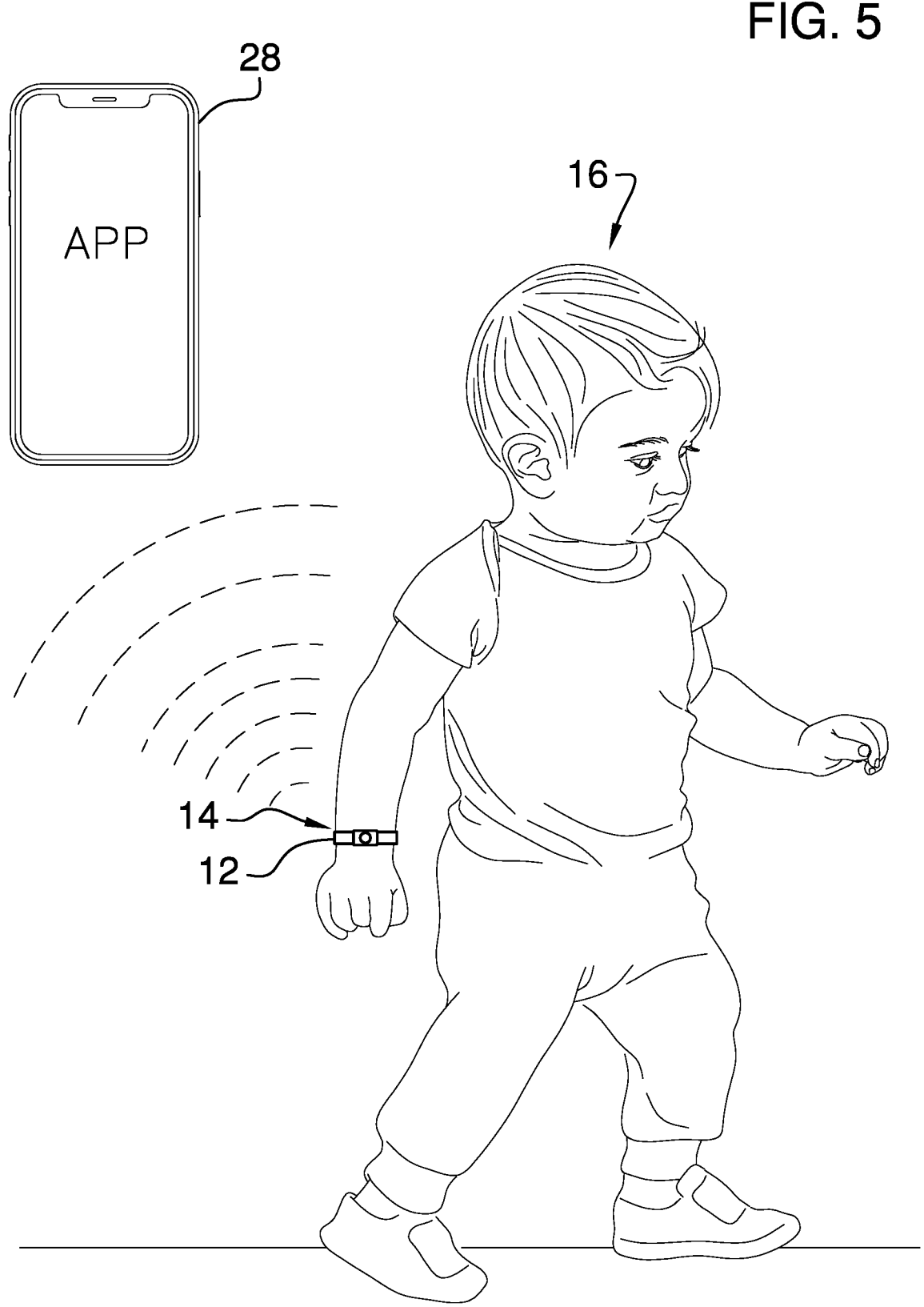
FIG. 5 is a perspective in-use view of an embodiment of the disclosure.
Figure 6:
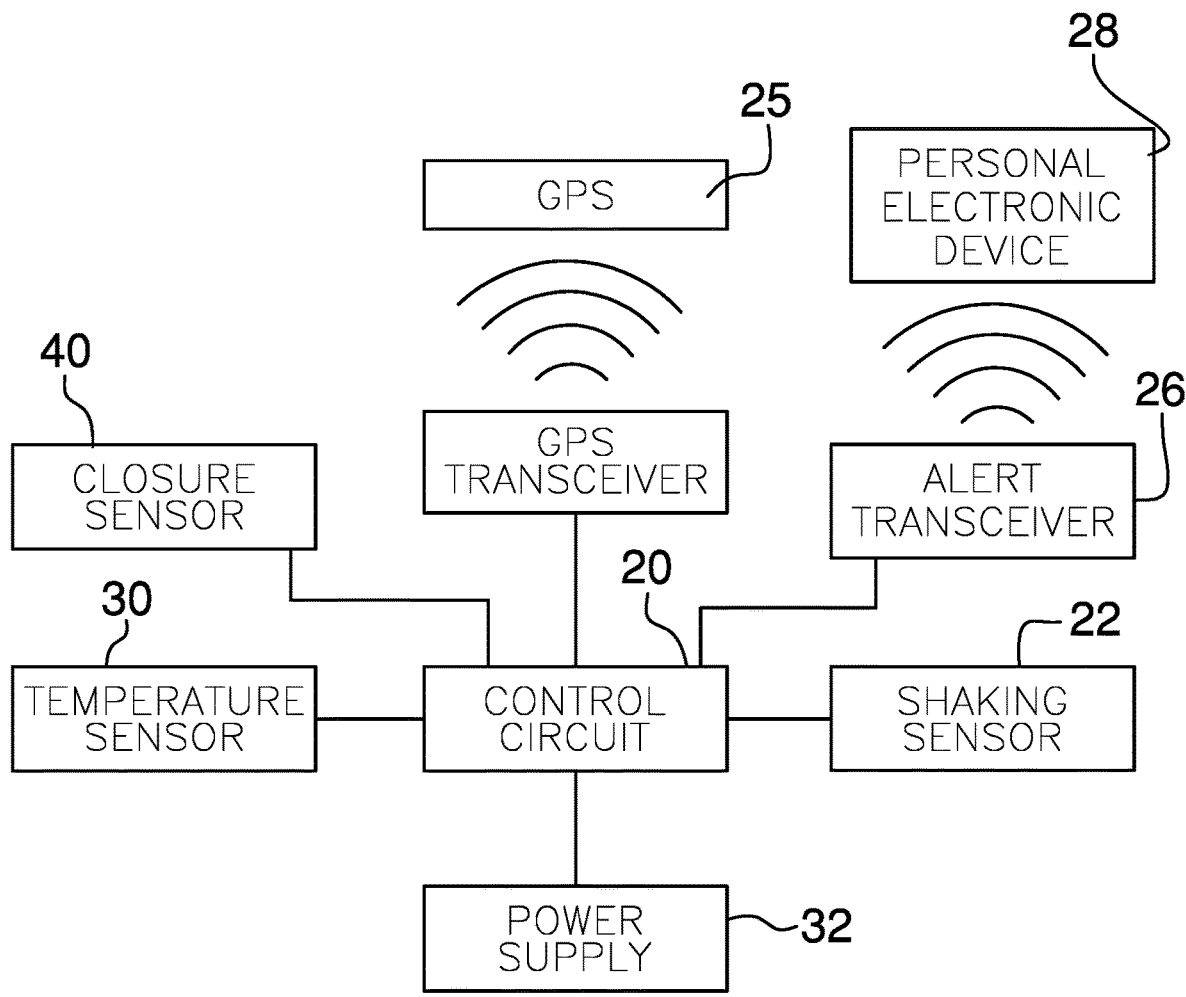
FIG. 6 is a schematic view of an embodiment of the disclosure.

As is most clearly shown in FIG. 2, the bracelet 12 may have a first end 34 that is matable to a second end 36. The first end 34 may include a tamper-proof closure 38 that engages the second end 36 in a manner that inhibits the child from being able to uncouple the first end 34 from the second end 36. Additionally, a closure sensor 40 may be integrated into the bracelet 12 that detects when the tamper-proof 38 closure is engaging the second end 36. The closure sensor 40 may be electrically coupled to the control circuit 20 and the alert transceiver 26 may broadcast the alert signal when the closure sensor 40 senses that the tamper-proof closure 38 has been disengaged from the second end 36.

In use, the bracelet 12 is worn on the child 16 and the personal electronic device 28 is synched with the alert transceiver 26. In this way the personal electronic device 28 receives physical location of from the gps transceiver 24 thereby facilitating the caregiver to track the location of the child 16. The alert transceiver 26 broadcasts the alert signal to the personal electronic device 28 when the control circuit 20 receives the temperature input. In this way the caregiver is notified that either the bracelet 12 has been removed from the child 16 or the child 16 is experiencing a fever. The alert transceiver 26 broadcasts the alert signal when the shaking sensor 22 is turned on. In this way the caregiver is notified that the child 16 has potentially been abducted or that the child 16 has experienced a violent fall.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A child tracking assembly for tracking the location of a child and notifying a caregiver if the child is being shaken, said assembly comprising:
   a bracelet being wearable around a wrist of a child;
   a shaking senor being integrated into said bracelet, said shaking sensor being turned on when said shaking sensor senses movement exceeding a pre-determined threshold of intensity wherein said shaking sensor is configured to sense when the child is being shaken by an assailant;
   a global positioning system (gps) transceiver being integrated into said bracelet, said gps transceiver being in communication with a gps for establishing the physical location of the child when the child is wearing said bracelet;
   an alert transceiver being integrated into said bracelet, said alert transceiver being in communication with a personal electronic device being carried by a caregiver, said alert transceiver broadcasting the physical location of the child to the personal electronic device wherein said alert transceiver is configured to facilitate the caregiver to track the child, said alert transceiver broadcasting an alert signal to the personal electronic device when said shaking sensor is turned on wherein said alert transceiver is configured to alert the caregiver that the child is in danger of being injured or abducted by an assailant;

a temperature sensor being coupled to said bracelet wherein said temperature sensor is configured to be in thermal communication with the child when the child wears said bracelet;

wherein said assembly includes a control circuit being integrated into said bracelet, said control circuit receiving a shake input, said control circuit receiving a temperature input;

wherein said shaking sensor is electrically coupled to said control circuit, said control circuit receiving said shake input when said shaking sensor is turned on;

wherein said gps transceiver is electrically coupled to said control circuit;

wherein said temperature sensor is electrically coupled to said control circuit, said control circuit receiving said temperature input when said temperature sensor senses a temperature that is either greater than or less than a pre-determined threshold temperature, said alert transceiver broadcasting a temperature alert signal to the personal electronic device when said control circuit receives said temperature input wherein said temperature sensor is configured to alert the caregiver that the bracelet has been removed from the child or that the child is experiencing a fever;

wherein said bracelet has an inwardly facing surface, said bracelet being comprised of a fluid permeable material wherein said bracelet is configured to pass air therethrough thereby facilitating the child's skin beneath said bracelet to breathe; and wherein said temperature sensor is positioned on said inwardly facing surface of said bracelet, said temperature sensor having a flat face extending around greater than half of a circumference of the inwardly facing surface thereby facilitating said temperature sensor to contact the user's skin when said bracelet is worn.

2. The assembly according to claim 1, wherein said alert transceiver is electrically coupled to said control circuit, said alert transceiver broadcasting said alert signal when said control circuit receives said shake input.

3. The assembly according to claim 1, further comprising a power supply being integrated into said bracelet, said power supply being electrically coupled to said control circuit, said power supply comprising at least one battery.

4. A child tracking assembly for tracking the location of a child and notifying a caregiver if the child is being shaken, said assembly comprising:

a bracelet being wearable around a wrist of a child, said bracelet having an inwardly facing surface, said bracelet being comprised of a fluid permeable material wherein said bracelet is configured to pass air therethrough thereby facilitating the child's skin beneath said bracelet to breathe;

a control circuit being integrated into said bracelet, said control circuit receiving a shake input, said control circuit receiving a temperature input;

a shaking senor being integrated into said bracelet, said shaking sensor being turned on when said shaking sensor senses movement exceeding a pre-determined threshold of intensity wherein said shaking sensor is configured to sense when the child is being shaken by an assailant, said shaking sensor being electrically coupled to said control circuit, said control circuit receiving said shake input when said shaking sensor is turned on;

a global positioning system (gps) transceiver being integrated into said bracelet, said gps transceiver being in communication with a gps for establishing the physical location of the child when the child is wearing said bracelet, said gps transceiver being electrically coupled to said control circuit;

an alert transceiver being integrated into said bracelet, said alert transceiver being in communication with a personal electronic device being carried by a caregiver, said alert transceiver broadcasting the physical location of the child to the personal electronic device wherein said alert transceiver is configured to facilitate the caregiver to track the child, said alert transceiver broadcasting an alert signal to the personal electronic device when said shaking sensor is turned on wherein said alert transceiver is configured to alert the caregiver that the child is in danger of being injured or abducted by an assailant, said alert transceiver being electrically coupled to said control circuit, said alert transceiver broadcasting said alert signal when said control circuit receives said shake input;

a temperature sensor being coupled to said bracelet wherein said temperature sensor is configured to be in thermal communication with the child when the child wears said bracelet, said temperature sensor being electrically coupled to said control circuit, said control circuit receiving said temperature input when said temperature sensor senses a temperature that is either greater than or less than a pre-determined threshold temperature, said alert transceiver broadcasting a temperature alert signal to the personal electronic device when said control circuit receives said temperature input wherein said temperature sensor is configured to alert the caregiver that the bracelet has been removed from the child or that the child is experiencing a fever, said temperature sensor being positioned on said inwardly facing surface of said bracelet, said temperature sensor having a flat face extending around greater than half of a circumference of the inwardly facing surface thereby facilitating said temperature sensor to contact the user's skin when said bracelet is worn; and a power supply being integrated into said bracelet, said power supply being electrically coupled to said control circuit, said power supply comprising at least one battery.

* * * * *